United States Patent
Nagarajan et al.

(10) Patent No.: US 7,295,341 B2
(45) Date of Patent: Nov. 13, 2007

(54) SYSTEM FOR PROCESSING MONOCHROME AND FULL-COLOR DIGITAL IMAGE DATA

(75) Inventors: Ramesh Nagarajan, Pittsford, NY (US); Francis K. Tse, Rochester, NY (US); Clara Cuciurean-Zapan, Fairport, NY (US); John C. Guarrera, Jr., Rochester, NY (US); David C. Allard, Rochester, NY (US); Joseph P. Taillie, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 1067 days.

(21) Appl. No.: 10/315,267

(22) Filed: Dec. 9, 2002

(65) Prior Publication Data

US 2004/0109182 A1    Jun. 10, 2004

(51) Int. Cl.
*G06F 15/00*    (2006.01)
*G03F 3/08*     (2006.01)

(52) U.S. Cl. .................. 358/1.9; 358/529; 358/523
(58) Field of Classification Search .................. 358/1.9, 358/1.13, 2.1, 523, 529, 520, 518, 515, 501, 358/539, 530; 382/167, 162
See application file for complete search history.

(56) References Cited

U.S. PATENT DOCUMENTS

| | | | | |
|---|---|---|---|---|
| 5,329,385 A | * | 7/1994 | Washio | 358/515 |
| 5,341,226 A | * | 8/1994 | Shiau | 358/518 |
| 5,459,590 A | * | 10/1995 | Bleker et al. | 358/518 |
| 5,655,061 A | | 8/1997 | Tse et al. | 358/1.2 |
| 5,786,906 A | | 7/1998 | Shishizuka | 358/500 |
| 5,911,004 A | | 6/1999 | Ohuchi et al. | 382/173 |
| 5,973,804 A | | 10/1999 | Yamada | 358/538 |
| 6,088,122 A | * | 7/2000 | Coleman | 358/1.9 |
| 6,330,085 B1 | * | 12/2001 | Yamamoto et al. | 358/538 |
| 6,377,703 B1 | | 4/2002 | Yeung | 382/173 |
| 6,459,501 B1 | * | 10/2002 | Holmes | 358/1.9 |
| 6,480,299 B1 | * | 11/2002 | Drakopoulos et al. | 358/1.9 |
| 6,574,010 B1 | * | 6/2003 | Ohnuma et al. | 358/1.9 |
| 6,778,300 B1 | * | 8/2004 | Kohler | 358/529 |
| 6,781,714 B1 | * | 8/2004 | Yanagita et al. | 358/1.9 |
| 6,842,268 B1 | * | 1/2005 | van Strijp et al. | 358/3.06 |
| 6,917,445 B2 | * | 7/2005 | Kuno et al. | 358/1.9 |
| 6,956,672 B1 | * | 10/2005 | Huang et al. | 358/1.9 |
| 6,980,327 B2 | * | 12/2005 | Yamamoto et al. | 358/1.9 |
| 7,075,670 B1 | * | 7/2006 | Koga | 358/1.15 |
| 7,088,470 B2 | * | 8/2006 | Lammens et al. | 358/1.9 |

\* cited by examiner

*Primary Examiner*—Madeleine A V Nguyen
(74) *Attorney, Agent, or Firm*—R. Hutter

(57) ABSTRACT

In a system for processing full-color image data, such as within a digital color printer or copier, a four-channel architecture is used. Three of the channels handle image data relating to primary color planes, such as CMY. In the other channel, values relating to the K value which goes with the CMY values for each pixel alternate with a B value, suitable for pure monochrome rendering of the pixel in the image. When it is desired to print or display the image in monochrome, the B values are isolated from the K values.

11 Claims, 3 Drawing Sheets

SYSTEM FOR PROCESSING MONOCHROME AND FULL-COLOR DIGITAL IMAGE DATA

TECHNICAL FIELD

The present invention relates to processing of digital image data, as would be found, for example, in digital printing, copying, and photography.

BACKGROUND

Color copying and printing is becoming commonplace in the office context. As is well known, color images have greater requirements than monochrome images, in the areas of image quality control, file size, bandwidth, etc. Therefore, there has been an incentive to discriminate among incoming images, such as those entering a digital copying or printing system through a digital scanner, to identify images as being either color or monochrome, so that each type of image is processed accordingly, and, specifically, resources such as memory and bandwidth for color images are not "wasted" in processing images which the human user is expecting to be monochrome. In another case, it may be desired to start with a full-color original image in the form of digital data (as would be found, for example, on a website) and print it out in monochrome; in such a case, a user would still like to obtain optimal possible image quality, without a quality loss resulting from rendering the original color image with a monochrome printer.

In designing a system, such as in the context of digital printing and copying, which is capable of discriminating between color and monochrome images, there has traditionally been two architectural strategies. First, there is a "two-pass" strategy, wherein the incoming image data (such as being recorded by the scanner of a digital copier) is sampled in a pre-scan to determine whether it is full-color or monochrome; following the determination, the image is re-scanned for suitable recording based on the determination. The two-pass approach clearly creates a speed problem in the context of digital scanning or copying. Another strategy includes recording the scanned image as two separate files, one full-color and the other monochrome. At the time of printing the image, the appropriate file is taken from memory. Such a strategy requires two sets of memory storage locations, since both files are created at the same time; further, any "middle function" operations common in digital printing, such as merging, rotation, n-up, etc., must be performed on both files and maintained in the memory.

DESCRIPTION OF THE PRIOR ART

U.S. Pat. No. 5,655,061 includes a description of each pixel value in a digital printing system being assigned a "pixel depth;" i.e., multiple bits can be assigned to a pixel area in the image data for purposes such as resolution enhancement in one dimension.

U.S. Pat. Nos. 5,786,906; 5,911,004; 5,973,804; and 6,377,703 describe methods for discriminating between full-color and monochrome image data. The '906 and '004 patents describe analyzing raw data from an input scanner to make a "judgement" as to whether the data is color or monochrome. The '804 patent makes a similar judgement, but analyzes the incoming image data on a line-by-line basis. The '703 patent teaches using an initial pre-scan of an image, such as in a digital copier, to make a determination of whether the image is color or monochrome, and then making a second scan for actual recording of the image data.

SUMMARY OF THE INVENTION

According to one aspect of the present invention, there is provided a method of processing digital image data, comprising conveying through a first channel a series of values relating to pixel data, wherein first values relating to a first colorant are commingled with second values.

According to another aspect of the present invention, there is provided a method of processing digital data relating to a color image, the digital data including a plurality of data sets, each data set including values corresponding to a series of pixels related to the image. The digital data is conveyed through a plurality of channels. In at least one channel, a set of first values is commingled with a set of second values.

DETAILED DESCRIPTION

Figure 1:
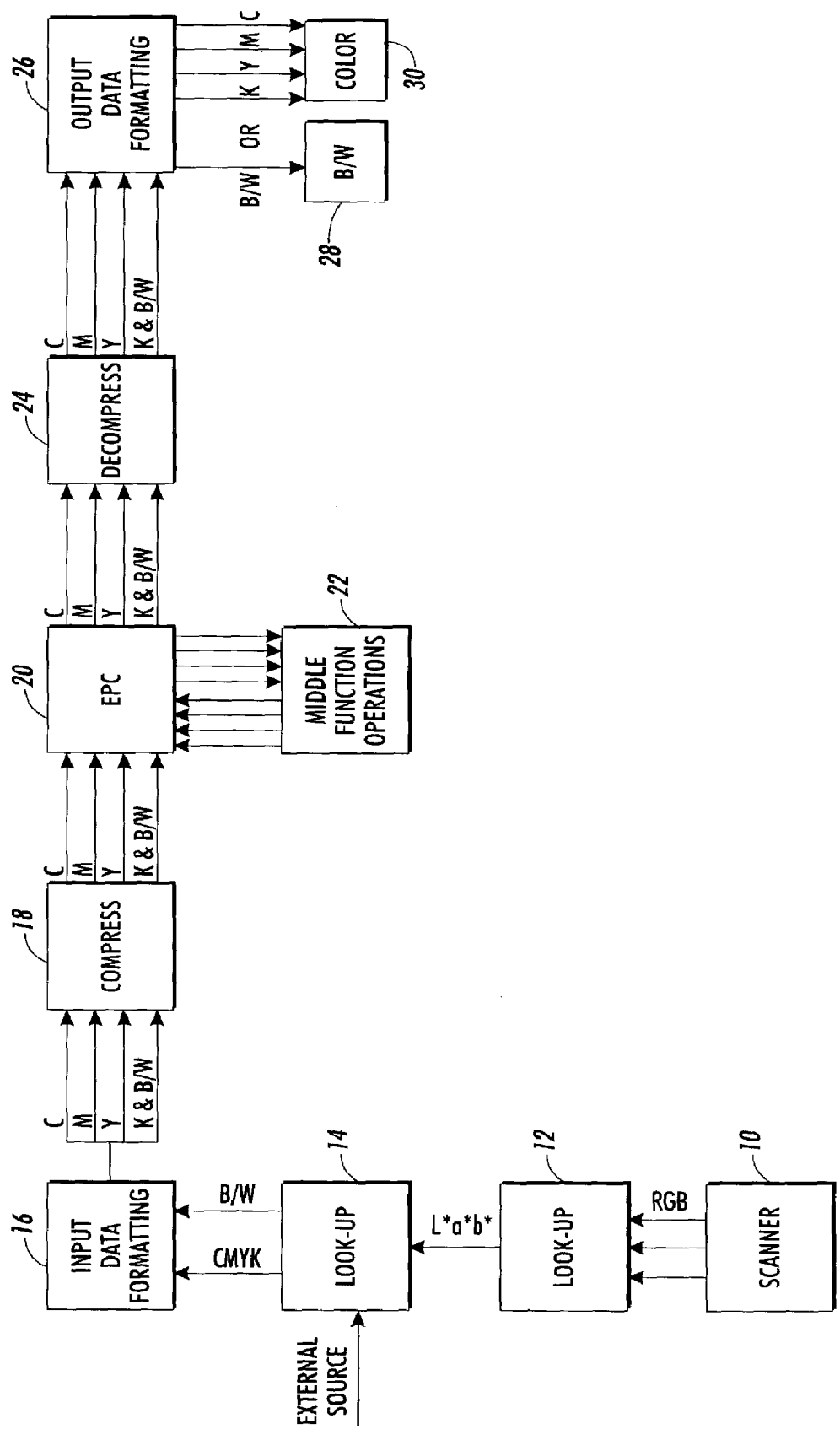
FIG. 1 is a systems diagram of a printer-copier system.

FIG. 1 is a systems diagram of a printer-copier system, although the invention can be manifest in any type of system handling image data, such as in digital photography or electronic displays. In the illustrated embodiment, hard-copy original images are scanned in through a conventional input scanner 10, as would be found, for example, in a digital copier. The typical "raw" image data output from such scanning hardware is three channels, each channel corresponding to an additive primary color, such as RGB. It is common in digital copying to convert the original RGB signals into a device-independent color space, such a L*a*b*, for further processing, as shown by the look-up table 12. (Throughout the present description, the various conversions of image data from one type of color space or format to another can be performed through look-up tables and/or other calculations, with dedicated chips, portions of chips, general-purpose processors, and/or through software.) Also, as shown, image data obtained from an external source, such as for digital printing from an electronic document or website, is typically retained in L*a*b* color space.

In the present embodiment, the image data from whatever source is converted, as shown at 14, to a CMYK color space format, as is generally typical in digital printing. In CMYK, each value associated with a pixel influences the placement of a primary-color colorant (ink or toner) in a pixel area. Further, however, there is derived from the L*a*b* data what is here called a "monochrome" data set, here indicated as B. This B data is intended to serve as a desirable format for printing the image data in monochrome form with maximum possible image quality. Typically, but not necessarily, this B data will be closely derived (such as an inverse) from the luminance signal L* in the device-independent L*a*b* data. The K data from the CMYK data will typically not be as suitable for monochrome display, because the K data is derived to take into account the presence of other colorants within the pixel, and thus would be influenced by, for example, undercolor removal and other considerations of full-color printing. Thus, if it is later desired to print or display (such as on an electronic display of a predetermined type) the image data in a monochrome form, this B data will be used exclusively, and the CMYK signals not at all.

Figure 2:
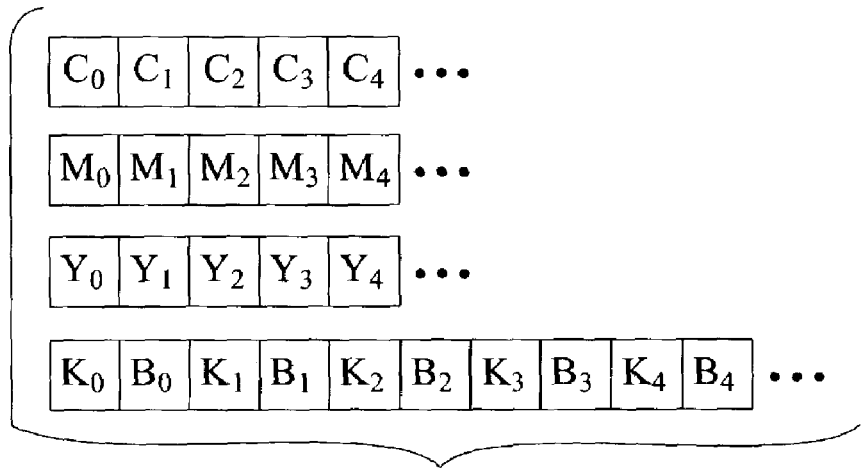
FIG. 2 is a diagram showing an arrangement of image data.

The CMYK plus B image data is then formatted, such as shown by 16, in a four-channel arrangement. A description of such an arrangement according to the embodiment is shown in FIG. 2. As can be seen, the primary-color CMY data streams are conveyed through their usual channels, such as through dedicated lines within a parallel bus (as between elements 16 and 18 in FIG. 1). However, in the fourth channel, the data (such as in bits, bytes, words, or other increments) for each pixel in the data stream alternates in time between the K value for the pixel and the B value for the same pixel. More broadly, within the fourth channel the K and B data are in one way or another "commingled," and there may be any number of ways to obtain this effect, such as alternating K and B data on a pixel-by-pixel basis, alternating multiple B pixels with multiple K pixels, alternating individual bits of K words or bytes with bits of B words or bytes, or even determining a relationship such as a difference between a K value and B value of a particular pixel and sending data based on the relationship.

Even though the arrangement of data shown in FIG. 2 at first appears to increase the required data flow through the K/B channel as opposed to the other "primary color" channels, in a practical implementation, only a small modification to a basic hardware architecture is necessary. It is common, in digital printing, to have a hardware architecture in which the image resolution is two bytes "deep," such as in a 600×600×2 spi (spots per inch) resolution. Many types of printing hardware have a capability for doubled resolution, such as 1200×600 spi, in a "fast-scan" direction (e.g., the direction of travel of an imaging laser beam across a charge receptor in a xerographic "laser printer," or the direction of printhead travel in an ink-jet printer). In short, many existing hardware architectures already have a basic capacity for in effect holding two bits or values per pixel for a particular color; with the present embodiment, instead of having two values for the K component in a full-color image, one of the values is the B component.

In a typical embodiment, the image data in its CMYK/B format is compressed through known means to a known lossless compression scheme (Huffman, G3, G4), such as at 18. The compressed data is then held in an "electronic pre-collation" or EPC memory such as 20, so that the compressed data can be subjected to, as needed, what are called "middle function operations," which can be carried out through look-up tables and/or other algorithms acting on the image data such as shown as 22. These middle function operations on the image data can include rotation, merging of multiple images, forming of n-up sheets for booklet making, and many others. A key advantage of the present embodiment is that major middle-function operations can be carried out on CMYK/B data in the exact same manner as with regular CMYK data, because the "extra" B value always remains with the CMYK data for each pixel.

Following the middle function operations, the CMYK/B data is decompressed, such as at 24, and then the data is formatted for printing or other display. Within a larger copying or printing system, it can be selected whether the image will be printed in monochrome or full color (even with a color printing apparatus, it may be desirable to print, for example, a proof copy in monochrome, such as to conserve marking material). In a basic case, if a monochrome print is desired, a formatting system such as 26 can take the K/B channel and "pick out," through known means, every other pixel datum to output the B image data and send it to a monochrome printer such as 28. If a color print is desired, the formatting system can separate out the K data and send it with the CMY data to a color printer 30.

Although in the illustrated embodiment the individual primary-color and other channels for conveyance of data from one element to the next are shown as serial lines, it is possible that each channel can be in the form of a parallel bus.

There can be utility, in some contexts, for analyzing both the K and B data in a particular image. Assuming that K data for an image is affected by image-processing and color-conversion techniques, such as undercolor removal, in a full color image, and the B data is not, pixel-by-pixel differences between the K and B values could hold indications of, for example, whether a pixel is likely to be part of a halftone image or text. These indications may be useful in "segmenting" an original image into text, screen, and/or halftone regions (or, more broadly, classifying an image or a portion of an image by type), such as in a digital copier, for enhancing print quality.

Figure 3:
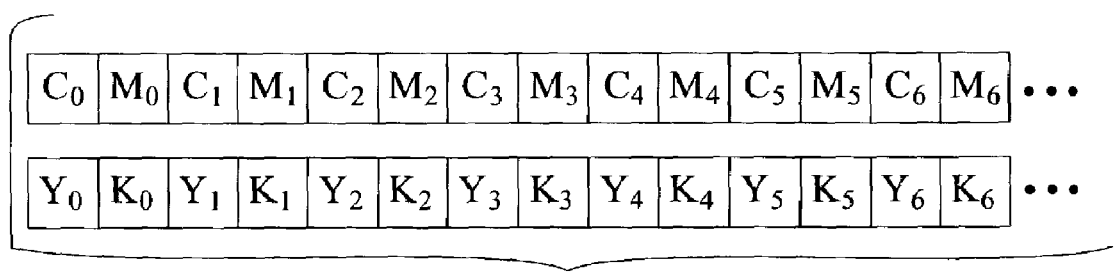
FIG. 3 is a diagram showing another arrangement of image data.

FIG. 3 is a diagram of another possible arrangement of full-color image data, in which CMYK data is conveyed in two channels, each channel handling values for two color planes, here CM and YK, although any other pairings are possible as well. Within each channel (and whether the channel is a serial line or a parallel bus), the values for each pixel alternate between the C value and M value, and the Y value and K value. This arrangement can be adapted for other color spaces or formats as well. This embodiment permits a full-color system to be adapted from a two-line architecture, which may be useful in, for instance, digital printer or copier, scanner, digital camera, wireless, or hand-held computer contexts.

Figure 4:
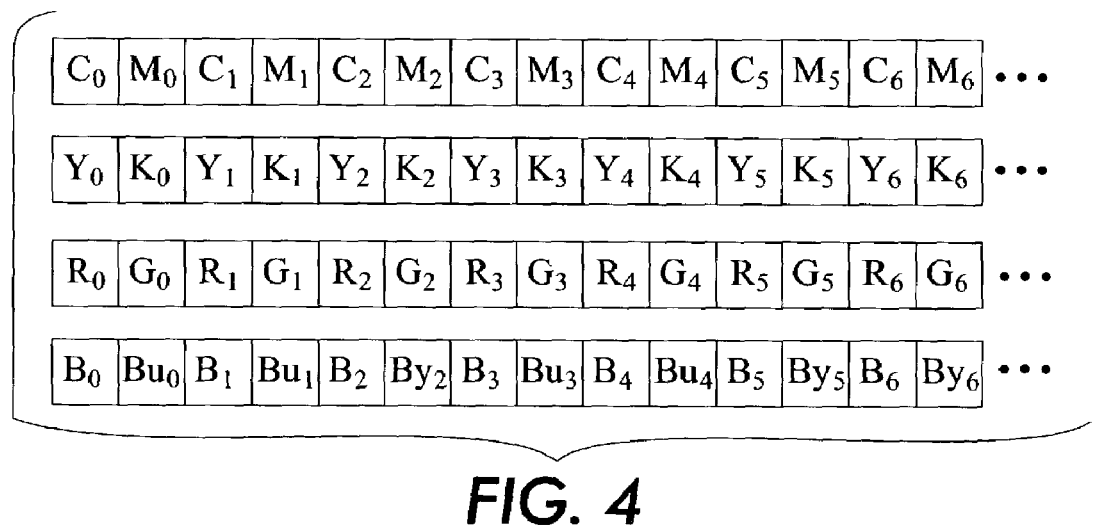
FIG. 4 is a diagram showing another arrangement of image data.

Such an arrangement can be used in adapting a customary four-channel architecture to operate a printing apparatus with more than four colorants, such as a hexachrome system. FIG. 4 shows one example how a four-channel hardware architecture, familiar for the standard CMYK color space, can be adapted to carry hexachrome digital image data in CMYK+RGB space, with a "leftover" portion of the fourth channel shown being used to carry the basic monochrome black B channel. (As shown, the blue in the RGB is noted as "Bu" to distinguish it from monochrome black B.)

Another variant is commingling metadata, such as a video and segmentation tag channel, with image data in one stream. One of the color data streams could have commingled therewith a 1-bit tag channel that contains tag information about the image, so as to help with classifying the image portion by type. One such example of the tag information would be the tag/edge information of the image which could be used to enhance and/or mark text/edges with a higher frequency halftone screen for obtaining a better rendition of the edges. This additional tag information could be stored in memory as part of the video channel and processed through middle function without altering the tag value. At the time of printing the tag information is passed onto the marking engine to improve the image quality of the output.

The invention claimed is:

1. A method of processing digital image data, comprising:
   conveying through a first channel a series of values relating to pixel data, wherein first values relating to a first colorant are commingled with second values, wherein the first values relate to K in a CMYK color rendering and the second values relate to one of a monochrome rendering and a luminance component in device-independent color space.

2. The method of claim 1, further comprising conveying through at least a second channel, a series of values relating to a second colorant in a color image.

3. The method of claim 1, wherein the first values alternate with second values.

4. The method of claim 1, wherein, for each of a plurality of pixels in the image, the first value relating to the pixel alternates with the second value relating to the pixel.

5. The method of claim 1, further comprising retaining the first values and second values associated with an image in a memory.

6. The method of claim 5, wherein, for each of a plurality of pixels in the image stored in memory, the first value relating to the pixel alternates with the second value relating to the pixel.

7. The method of claim 5, further comprising performing an operation on the first values and second values associated with an image.

8. A method of processing digital image data, comprising:
conveying through a first channel a series of values relating to pixel data, wherein first values relating to a first colorant are commingled with second values;
retaining the first values and second values associated with an image in a memory; and
performing an operation on the first values and second values associated with an image, wherein the operation includes rotation of the image.

9. The method of claim 7, wherein the operation includes compression of the image.

10. The method of claim 1, wherein the second value relates to information useful in classifying the image data.

11. The method of claim 1, wherein the first value relates to K in a CMYK color rendering, and the second values relate to a monochrome rendering; and further comprising
for a pixel, comparing the first value and the second value for classifying the image data.

* * * * *